US012451885B2

(12) United States Patent
Gu

(10) Patent No.: US 12,451,885 B2

(45) Date of Patent: Oct. 21, 2025

(54) DATA TRANSMISSION CIRCUIT, DATA TRANSMISSION METHOD AND ELECTRONIC DEVICE

(71) Applicant: CHANGXIN MEMORY TECHNOLOGIES, INC., Hefei (CN)

(72) Inventor: Yinchuan Gu, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 246 days.

(21) Appl. No.: 18/366,804

(22) Filed: Aug. 8, 2023

(65) Prior Publication Data

US 2023/0378955 A1 Nov. 23, 2023

Related U.S. Application Data

(63) Continuation of application No. PCT/CN2022/082208, filed on Mar. 22, 2022.

(30) Foreign Application Priority Data

Jan. 6, 2022 (CN) ......................... 202210011419.1

(51) Int. Cl.

*H03K 19/003* (2006.01)
*H03K 3/037* (2006.01)

(Continued)

(52) U.S. Cl.

CPC ....... *H03K 19/00346* (2013.01); *H03K 3/037* (2013.01); *H03K 19/20* (2013.01); *H04L 25/03* (2013.01)

(58) Field of Classification Search

CPC . H03M 9/00; H03K 19/003; H03K 19/00346; H03K 19/01; H03K 19/0175;

(Continued)

(56) References Cited

U.S. PATENT DOCUMENTS 5,757,242 A 5/1998 Chow
5,796,313 A 8/1998 Eitan (Continued)

FOREIGN PATENT DOCUMENTS

CN 101636905 A 1/2010
CN 104579319 A 4/2015

(Continued)

OTHER PUBLICATIONS

International Search Report in the international application No. PCT/CN2022/082208, mailed on Sep. 14, 2022. 2 Pages.

(Continued)

*Primary Examiner* — Jason M Crawford

(74) *Attorney, Agent, or Firm* — Syncoda LLC; Feng Ma

(57) ABSTRACT

A data transmission circuit, a data transmission method and an electronic device are provided. The data transmission circuit includes a data processing circuit and a data driving circuit. The data processing circuit is configured to receive a first data signal in a parallel state and convert the first data signal into a second data signal in a serial state. The data driving circuit includes a driving main circuit and a driving regulation circuit. The driving regulation circuit is configured to reduce, in response to the driving regulation circuit being in an enabled state, a voltage difference of the second data signal, to shorten a charging and discharging time and implement driving enhancement. The driving main circuit is configured to perform driving on an enhanced second data signal to obtain a target transmission signal.

20 Claims, 7 Drawing Sheets

(51) Int. Cl.
*H03K 19/20* (2006.01)
*H04L 25/03* (2006.01)

(58) Field of Classification Search
CPC ............ H03K 19/017509; H04L 25/03; H04L 25/03114; G11C 7/10; G11C 7/106; G11C 7/1084
See application file for complete search history.

(56) References Cited

U.S. PATENT DOCUMENTS

| | | | | |
|---|---|---|---|---|
| 6,281,729 | B1 | 8/2001 | Ang | |
| 7,719,307 | B2 | 5/2010 | Lee | |
| 7,733,708 | B2 | 6/2010 | Choi | |
| 8,742,822 | B2 | 6/2014 | Yanagidaira | |
| 10,158,354 | B2 | 12/2018 | Dutta et al. | |
| 10,476,516 | B1 | 11/2019 | Chuai | |
| 11,031,054 | B1 | 6/2021 | Arai | |
| 2002/0105356 | A1 | 8/2002 | Genna | |
| 2005/0216623 | A1* | 9/2005 | Dietrich | H03M 9/00 710/71 |
| 2007/0153591 | A1 | 7/2007 | Choi | |
| 2008/0129561 | A1 | 6/2008 | Shim | |
| 2008/0231322 | A1 | 9/2008 | Mohammad et al. | |
| 2009/0167344 | A1 | 7/2009 | Lee | |
| 2010/0061157 | A1 | 3/2010 | Lee | |
| 2011/0007591 | A1 | 1/2011 | Lee | |
| 2012/0105107 | A1 | 5/2012 | Moon | |
| 2013/0335152 | A1 | 12/2013 | Burnette | |
| 2015/0123826 | A1* | 5/2015 | Lee | H03M 9/00 341/101 |
| 2015/0303930 | A1 | 10/2015 | Chen | |
| 2018/0123593 | A1 | 5/2018 | Choi | |
| 2023/0111807 | A1* | 4/2023 | Choi | G11C 7/222 365/189.05 |
| 2023/0216713 | A1* | 7/2023 | Gu | H04L 25/03114 375/285 |
| 2023/0378955 | A1* | 11/2023 | Gu | H04L 25/03 |

FOREIGN PATENT DOCUMENTS

| | | | |
|---|---|---|---|
| CN | 108418577 | A | 8/2018 |
| CN | 111030703 | A | 4/2020 |
| CN | 113162653 | A | 7/2021 |
| CN | 114024544 | A | 2/2022 |
| JP | 2006060690 | A | 3/2006 |
| KR | 20180049483 | A | 5/2018 |
| WO | 2021258963 | A1 | 12/2021 |

OTHER PUBLICATIONS

First Office Action of the Chinese application No. 202210011419.1, issued on Feb. 15, 2022. 17 Pages with English translation.

Sun Lihua, "Digital Electronic Technology Application Tutorial", Huazhong University of Science and Technology Press, Sep. 30, 2018, p. 29-p. 33. 7 pages with English translation.

Zhuang Yiqi, "Electronic design reliability engineering" Xidian University Press, Sep. 30, 2014, p. 202-p. 206. 7 Pages with English translation.

Third Office Action of the Chinese application No. 202210011419.1, issued on Mar. 31, 2022. 19 Pages with English abstract.

Jiang Jingguang, AL. "Realization of Fully Differential Low Voltage and High Drive Operational Amplifier", Journal of Electronic Measurement and Instrument, Jun. 2006, vol. 20 No.3, p. 43-p. 46. 4 Pages with English translation.

Yun-Hsiang Wang, AL. "High Output Swing Monolithic Inverter with E-D Mode MIS-HEMTs for GaN Power Integrated Circuits", IEEE PEDS 2015, Sydney, Australia Jun. 9-12, 2015, p. 585-p. 588. 4 Pages.

Notice of Allowance of the Chinese application No. 202210011419.1, issued on Jun. 28, 2022. 7 Pages with English translation.

First Office Action of the Chinese application No. 202210011424.2, issued on Feb. 15, 2022. 20 Pages with English translation.

Second Office Action of the Chinese application No. 202210011424.2, issued on Mar. 11, 2022. 10 Pages with English abstract.

First Office Action of the Taiwanese application No. 111125897, issued on Jul. 26, 2023. 6 Pages with English abstract.

* cited by examiner

DATA TRANSMISSION CIRCUIT, DATA TRANSMISSION METHOD AND ELECTRONIC DEVICE

CROSS-REFERENCE TO RELATED APPLICATION

This is a continuation of International Patent Application No. PCT/CN2022/082208, filed on Mar. 22, 2022, which claims priority to Chinese Patent Application No. 202210011419.1, filed on Jan. 6, 2022 and entitled "DATA TRANSMISSION CIRCUIT, DATA TRANSMISSION METHOD AND ELECTRONIC DEVICE". The disclosures of International Patent Application No. PCT/CN2022/082208 and Chinese Patent Application No. 202210011419.1 are hereby incorporated by reference in their entireties.

BACKGROUND

A data selector is required in an electronic device to convert parallel data into serial data, and then the serial data is transmitted backward. When an operating frequency of the electronic device is high, Inter symbol Interference (ISI) is caused due to overload of the data selector. In other words, a data transmission speed of the electronic device is limited due to a speed of the data selector. In order to achieve a high data transmission speed, this problem should be overcome.

SUMMARY

The disclosure relates to the technical field of semiconductor memory, in particular to a data transmission circuit, a data transmission method and an electronic device, which can at least partially improve the ISI problem and increase the data transmission speed.

A first aspect of the embodiments of the present disclosure provides a data transmission circuit including a data processing circuit and a data driving circuit.

The data processing circuit is configured to receive a first data signal in a parallel state and convert the first data signal into a second data signal in a serial state.

The data driving circuit includes a driving main circuit and a driving regulation circuit, and is configured to reduce, in response to the driving regulation circuit being in an enabled state, a voltage difference of the second data signal through the driving regulation circuit, to shorten a charging and discharging time and implement driving enhancement. The data driving circuit is configured to perform, through the driving main circuit, driving on an enhanced second data signal to obtain a target transmission signal.

A second aspect of the embodiments of the present disclosure provides a data transmission method applied to a data transmission circuit, and the data transmission circuit includes a driving regulation circuit, the method includes the following operations.

A first data signal in a parallel state is determined, and the first data signal is converted into a second data signal in a serial state.

In response to the driving regulation circuit being in an enabled state, a voltage difference of the second data signal is reduced through the driving regulation circuit, to shorten a charging and discharging time and implement driving enhancement. Driving is performed, through the driving main circuit, on an enhanced second data signal to obtain a target transmission signal.

A third aspect of embodiments of the present disclosure provides an electronic device including the data transmission circuit as described in the first aspect.

DETAILED DESCRIPTION

Figure 1:
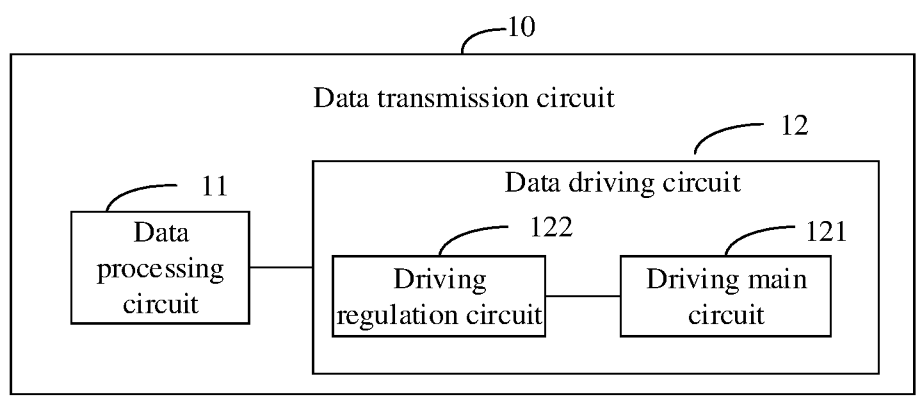
FIG. 1 is a schematic structural diagram of a data transmission circuit according to an embodiment of the present disclosure.

The technical solution in the embodiment of the present disclosure will be clearly and completely described below in conjunction with the drawings in the embodiment of the present disclosure. It can be appreciated that the specific embodiments described herein are intended only to explain the relevant disclosure rather than limiting the disclosure. In addition, it should be noted that for convenience of description, only portions related to the relevant disclosure are shown in the drawings.

Unless otherwise defined, all technical and scientific terms used herein have the same meaning as commonly understood by those skilled in the technical field of the present disclosure. The terms used herein is only for the purpose of describing the present disclosure, and is not intended to limit the present disclosure.

In the following description, "some embodiments" describe a subset of all possible embodiments, but it is understood that "some embodiments" may be the same subset or different subsets of all possible embodiments, and may be combined with each other without conflict.

It should be noted that, the terms "first\ second \third" in the present disclosure are used for distinguishing similar objects and do not indicate a specific sequence of the similar objects. It is to be understood that the terms "first\second\third" may be interchangeable under an appropriate condition, so that the embodiments of the present disclosure described herein are, for example, capable of being implemented in a sequence other than those illustrated or described herein.

Abbreviations related to embodiments of the present disclosure are explained.

DRAM: Dynamic Random Access Memory.

SRAM: Static Random-Access Memory.

SDRAM: Synchronous Dynamic Random Access Memory.

DDR: Double Data Rate SDRAM.

DDR4: technical specification of the 4th edition of DDR.

DDR5: technical specification of the 5th edition of DDR.

Mbps: Million bits per second.

4-1 MUX: one out of four data selector.

Compared with DDR4, the data transmission speed in DDR5 has increased from 3200 Mbps to 6400 Mbps. However, there are some limitations in the data transmission process in related technologies, such as ISI in high-speed data transmission, which limits the development of electronic device.

In the data transmission process, a data selector (such as 4-1 MUX) is required to convert parallel data into serial data, so as to realize sequential output. Also, the load pressure of the data selector increases with an increase of the data transmission speed, so the data selector is one of the bottlenecks limiting the transmission speed.

The embodiments of the present disclosure provide a data transmission circuit. The data transmission circuit includes a data processing circuit configured to receive first data signal in a parallel state and convert the first data signal into the second data signal in a serial state; and a data driving circuit including a driving main circuit and a driving regulation circuit, and configured to reduce, in response to the driving regulation circuit being in an enabled state, a voltage difference of the second data signal through the driving regulation circuit, to shorten a charging and discharging time and implement driving enhancement; and perform, through the driving main circuit, driving on an enhanced second data signal to obtain a target transmission signal. In this way, the driving enhancement can be performed, through the driving regulation circuit, on the signal in the transmission process, thereby improving the transmission performance of the signal, partially improving the ISI problem and improving the data transmission speed.

Embodiments of the present disclosure will be described in detail below with reference to the accompanying drawings.

In an embodiment of the present disclosure, with reference to FIG. 1, which is a schematic structural diagram of a data transmission circuit 10 according to an embodiment of the present disclosure, the data transmission circuit 10 may include the data processing circuit 11 and a data driving circuit 12 as shown in FIG. 1.

The data processing circuit 11 is configured to receive a first data signal in a parallel state and convert the first data signal into a second data signal in a serial state.

The data driving circuit 12 includes a driving main circuit 121 and a driving regulation circuit 122, and is configured to reduce, in response to the driving regulation circuit 122 being in an enabled state, a voltage difference of the second data signal through the driving regulation circuit 122, to shorten a charging and discharging time and implement driving enhancement; and perform, through the driving main circuit 121, driving on an enhanced second data signal to obtain a target transmission signal.

It should be noted that the data transmission circuit 10 in the embodiments of the present disclosure is applied to a variety of semiconductor memories such as DRAM, SRAM, SDRAM and the like, which are only examples in the embodiments of the present disclosure hereafter and are not limited thereto.

The data transmission circuit 10 may include the data processing circuit 11 and the data driving circuit 12. The data processing circuit 11 is configured to perform serialization on a parallel signal (i.e., the first data signal) to obtain a serial signal (i.e., the second data signal). The data driving circuit 12 is configured to perform driving on the serial signal to obtain the target transmission signal, so that the target transmission signal can continue to be transmitted subsequently to a next processing module.

The data driving circuit 12 may include the driving main circuit 121 and a driving regulation circuit 122. Herein, the driving regulation circuit 122 may be enabled or disabled. In response to the driving regulation circuit 122 being enabled, the driving regulation circuit 122 acquires the second data signal and performs driving enhancement on the second data signal, and then the driving main circuit 121 performs driving on the enhanced second data signal to obtain a target transmission signal.

In this way, in a case where the transmission speed is high, after the data processing circuit 11 converts the first data signal in the parallel state into the second data signal in the serial state, the driving regulation circuit 122 performs driving enhancements on the second data signal, and then the driving main circuit 121 performs driving on the enhanced second data signal to obtain the target transmission signal. In this way, since the driving enhancements is performed on the signal in the transmission process, the target transmission signal has good transmission performance, the subsequently transmission speed is fast, thereby avoiding ISI, and improving the operating frequency of the semiconductor memory.

In addition, when the driving regulation circuit 122 is disabled, the driving main circuit 121 performs driving on the second data signal to obtain the target transmission signal. Therefore, in some embodiments, the data transmission circuit 10 is also configured to perform driving on the second data signal through the driving main circuit 121 in response to the driving regulation circuit being in a disabled state, to obtain the target transmission signal.

In this way, in a case where the transmission speed is low, after the data processing circuit 11 converts the first data signal in the parallel state into the second data signal in the serial state, the driving main circuit 121 performs driving on the second data signal to obtain the target transmission signal. Thus, the driving regulation circuit 122 is disabled when the transmission speed is low, thereby saving current and reducing power consumption.

In some embodiments, the driving regulation circuit 122 is configured to pull a first voltage value down to obtain a second voltage value, and pull a third voltage value up to obtain a fourth voltage value, to implement the driving enhancement.

Herein, each of the first voltage value and the second voltage value is in a first level range, the second voltage value is less than the first voltage value, each of the third voltage value and the fourth voltage value is in a second level range, the fourth voltage value is greater than the third voltage value, and the second voltage value is greater than the fourth voltage value.

It should be noted that, for example, the first level range may be a level range of a logic signal “1” and the second level range may be a level range of a logic signal “0”.

In other words, the first voltage value is the logic signal “1” in the second data signal and the third voltage value is the logic signal “0” in the second data signal. In other words, after the driving regulation circuit 122 is enabled, the driving regulation circuit 122 performs pull down a voltage of the logic signal “1” in the second data signal and pull up a voltage of the logic signal “0” in the second data signal, to obtain an enhanced second data signal. In this way, through the driving enhancement, the voltage difference between the logic signal “1” and the logic signal “0” is reduced, the time for charging and discharging the device/node in the circuit gets shorter, and subsequent transmission can be performed at a fast speed.

Herein, the logic signal "1", the voltage of which is pulled down, is still within the first level range, i.e., voltage pull-down processing does not cause a change from the logic signal "1" to the logic signal "0". Similarly, the logic signal "0", the voltage of which is pulled up, is still within second level range, that is, voltage pull-up processing does not cause a change from the logic signal "0" to the logic signal "1".

In some embodiments, the driving main circuit 121 at least includes pre-driving circuit and a main driving circuit. Accordingly, a driving regulation circuit may be provided at an input end of the pre-driving circuit, or a driving regulation circuit may be provided at an input end of the main driving circuit, or a driving regulation circuit may be provided at each of the input end of the pre-driving circuit and the input end of the main driving circuit.

Figure 2:
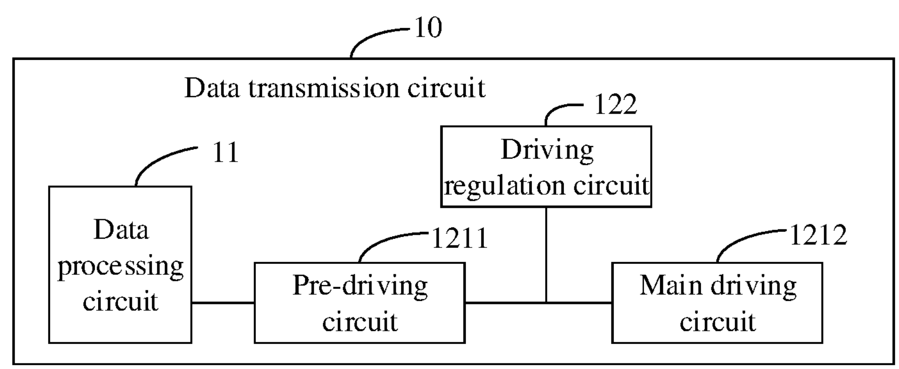
FIG. 2 is a schematic structural diagram of another data transmission circuit according to an embodiment of the present disclosure.

In a specific embodiment, the driving regulation circuit is provided at the input end of the main driving circuit. With reference to FIG. 2 which is a schematic structural diagram of another data transmission circuit 10 according to an embodiment of the present disclosure, the driving main circuit 121 includes a pre-driving circuit 1211 and a main driving circuit 1212 as shown in FIG. 2, and the driving regulation circuit 122 is connected to the input end of the main driving circuit 1212.

The pre-driving circuit 1211 is configured to perform pre-driving on the second data signal to obtain a pre-driven second data signal.

In response to the driving regulation circuit 122 being in the enabled state, the main driving circuit 1212 is configured to perform main driving on the enhanced second data signal to obtain the target transmission signal after the driving regulation circuit 122 performs driving enhancement on the pre-driven second data signal.

Alternatively, in some embodiments, the main driving circuit 1212 is further configured to perform, in response to the driving regulation circuit 122 being in a disabled state, main driving on the pre-driven second data signal to obtain the target transmission signal.

It should be noted that, as shown in FIG. 2, an operation process of the data transmission circuit 10 includes the following two cases.

In a first case where the driving regulation circuit 122 is enabled, the data processing circuit 11 converts the first data signal in the parallel state into the second data signal in the serial state. The pre-driving circuit 1211 performs pre-driving on the second data signal; then driving regulation circuit 122 performs enhancement on the pre-driven second data signal, and the main driving circuit 1212 performs main driving on the enhanced second data signal, to obtain the target transmission signal.

In a second case where the driving regulation circuit 122 is disabled, the data processing circuit 11 converts the first data signal in the parallel state into the second data signal in the serial state. The pre-driving circuit 1211 performs pre-driving on the second data signal; and then the main driving circuit 1212 directly performs main driving on the pre-driven second data signal to obtain the target transmission signal.

In this way, a state of the driving regulation circuit 122 can be changed in accordance with different load conditions while taking both signal transmission performance and energy consumption into account.

In addition, in another specific embodiment, a driving regulation circuit is provided at the input end of the pre-driving circuit, that is, the input end of the driving regulation circuit 122 is connected to the input end of the pre-driving circuit 1211, and operation principles of the driving regulation circuit and pre-driving circuit can be understood with reference to the aforementioned situation, which is not repeatedly in the embodiment of this disclosure.

Figure 3:
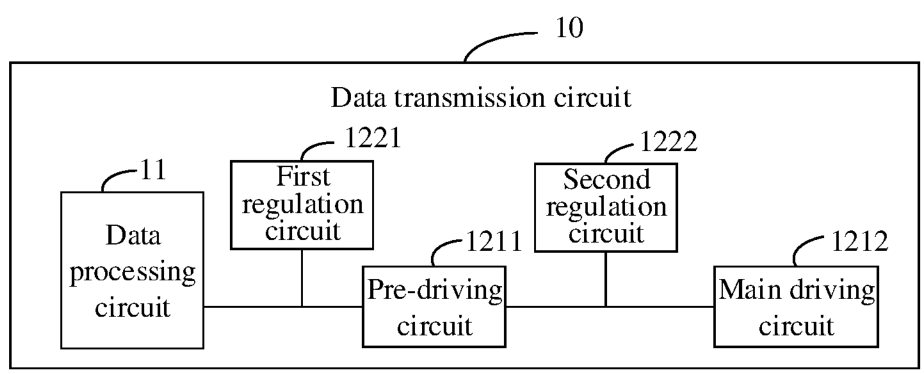
FIG. 3 is a schematic structural diagram of another data transmission circuit according to an embodiment of the present disclosure.

In yet another specific embodiment, the driving regulation circuit is provided at each of the input end of the pre-driving circuit and the input end of the main driving circuit. With reference to FIG. 3, which is a schematic structural diagram of another data transmission circuit 10 according to an embodiment of the present disclosure, the driving main circuit 121 includes a pre-driving circuit 1211 and a main driving circuit 1212 as shown in FIG. 3. The driving regulation circuit 122 includes a first regulation circuit 1221 connected to the input end of the pre-driving circuit 1211, and a second regulation circuit 1222 connected to the input end of the main driving circuit 1212.

The data driving circuit 12 is further configured to, in response to each of the first regulation circuit 1221 and the second regulation circuit 1222 being in the enabled state, perform driving enhancement on the second data signal through the first regulation circuit 1221 to obtain a primary enhanced second data signal, perform pre-driving on the primary enhanced second data signal through the pre-driving circuit 1211 to obtain a pre-driven second data signal, perform driving enhancement on the pre-driven second data signal through the second regulation circuit 1222 to obtain a secondary enhanced second data signal; and perform main driving on the secondary enhanced second data signal through the main driving circuit 1212 to obtain the target transmission signal.

Alternatively, in some embodiments, the data driving circuit 12 is further configured to, in response to the first regulation circuit 1221 being in the disabled state and the second regulation circuit 1222 being in the enabled state, perform pre-driving on the second data signal through the pre-driving circuit 1211 to obtain the pre-driven second data signal, perform driving enhancement on the pre-driven second data signal through the second regulation circuit 1222 to obtain the enhanced second data signal, and perform main driving on the enhanced second data signal through the main driving circuit 1212 to obtain the target transmission signal.

Alternatively, in some embodiments, the data driving circuit 12 is further configured to, in response to each of the first regulation circuit 1221 and the second regulation circuit 1222 being in the disabled state, perform pre-driving on the second data signal through the pre-driving circuit 1211 to obtain the pre-driven second data signal; and perform main driving on the pre-driven second data signal through the main driving circuit 1212 to obtain the target transmission signal.

In this way, as shown in FIG. 3, the operation process of the data transmission circuit 10 includes the following three cases.

In a first case where each of the first regulation circuit 1221 and the second regulation circuit 1222 is enabled, the data processing circuit 11 converts the first data signal in the parallel state into the second data signal in the serial state. The first regulation circuit 1221 performs primary enhancement on the second data signal, and then the pre-driving circuit 1211 performs pre-driving on the primary enhanced second data signal. The second regulation circuit 1222 performs secondary enhancement on the pre-driven second data signal. The main driving circuit 1212 performs main driving on the secondary enhanced second data signal, to obtain the target transmission signal.

In a second case where the first regulation circuit 1221 is disabled and the second regulation circuit 1222 is enabled, the data processing circuit 11 converts the first data signal in the parallel state into the second data signal in the serial state. The pre-driving circuit 1211 performs pre-driving on the second data signal. The second regulation circuit 1222 performs enhancement on the pre-driven second data signal. The main driving circuit 1212 performs main driving on the enhanced second data signal, to obtain the target transmission signal.

In a third case where each of the first regulation circuit 1221 and the second regulation circuit 1222 is disabled, the data processing circuit 11 converts the first data signal in the parallel state into the second data signal in the serial state. The pre-driving circuit 1211 performs pre-driving on the second data signal, and then the main driving circuit 1212 performs main driving on the pre-driven second data signal to obtain the target transmission signal.

It should be noted that as shown in FIG. 3, the operation process of the data transmission circuit 10 may also include a fourth case in which the first regulation circuit 1221 is enabled and the second regulation circuit 1222 is disabled. The effect of the fourth case is close to that of the second case mentioned above (i.e., the case that the first regulation circuit 1221 is disabled and the second regulation circuit 1222 is enabled). In order to improve the control efficiency, the fourth case is yet not applied in the embodiments of the present disclosure, and those skilled in the art can select the case according to the actual situation. So the case is also within the protection scope of the embodiments of the present disclosure.

In this way, the states of the first regulation circuit 1221 and the second regulation circuit 1222 can be changed in accordance different load conditions while taking both signal transmission performance and energy consumption into account.

It should be understood that regarding the specific structures of the pre-driving circuit 1211 and the main driving circuit 1212, reference may be made to the conventional driving circuit architecture, which is not repeatedly in the embodiments of the present disclosure.

Figure 4:
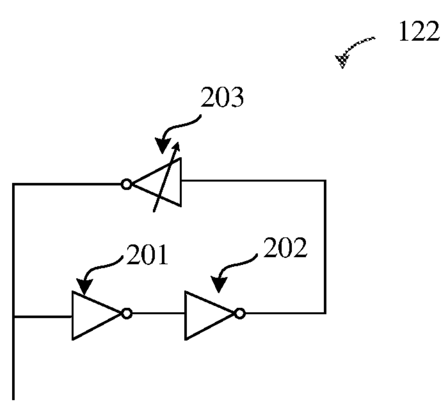
FIG. 4 is a schematic structural diagram of a driving regulation circuit according to an embodiment of the present disclosure.

In some embodiments, with reference to FIG. 4, which is a schematic structural diagram of a driving regulation circuit 122 according to an embodiment of the present disclosure, the driving regulation circuit 122 may include a first NOT gate module 201, a second NOT gate module 202 and a third regulatable NOT gate module 203 as shown in FIG. 4.

An output end of the first NOT gate module 201 is connected to an input end of the second NOT gate module 202, and an output end of the second NOT gate module 202 is connected to an input end of the third regulatable NOT gate module 203.

An output end of the third regulatable NOT gate module 203 is connected to an input end of the first NOT gate module 201, to receive the second data signal and output the enhanced second data signal.

It should be noted that the data transmission circuit 10 may include multiple driving regulation circuits 122. In this case, each driving regulation circuit 122 adopts the above circuit structure. For example, each of the aforementioned first regulation circuit 1221 and second regulation circuit 1222 adopts the structure shown in FIG. 4, i.e. each of the first regulation circuit 1221 and the second regulation circuit 1222 are constituted by three NOT gate modules.

In this way, through the three NOT gate modules, the property of the logic signal in the second data signal will not change, but a voltage is pulled down or pulled up to perform the driving enhancement on the second data signal, so that the transmission performance of the signal is improved.

It should also be noted that, in the driving regulation circuit 122, enabling or disabling of the driving regulation circuit 122 can be controlled by the second NOT gate module 202, and the operating parameters of the driving regulation circuit 122 can be regulated by the third regulatable NOT gate module 203, to regulate an amplitude of the driving enhancement. Herein, the amplitude of the driving enhancement may include a pull-up amplitude of the voltage and a pull-down amplitude of the voltage.

That is to say, according to the embodiment of the present disclosure, multi-level control may be also performed on the driving regulation circuit 122 to balance the transmission efficiency and the power consumption. Thus, in some embodiments, the data transmission circuit 10 further includes a control circuit (not shown in the drawings).

The control circuit is configured to control the driving regulation circuit 122 to be in the enabled state or the disabled state, and/or regulate the operating parameters of the driving regulation circuit 122 to regulate the amplitude of the driving enhancement performed by the driving regulation circuit 122.

It should be noted that in the embodiment of the present disclosure, a driving regulation circuit 122 can provide at least two levels of control strategies. Firstly, the second NOT gate can control the driving regulation circuit 122 to be enabled or disabled, to determine whether to perform driving enhancement. Secondly, when the driving regulation circuit 122 is in the enabled state, the third regulatable NOT gate module can control the operating parameters of the driving regulation circuit 122, thereby regulating the amplitude of the driving enhancement.

Therefore, in some embodiments, the control circuit is also configured to control the driving regulation circuit 122 to be in the enabled state or the disabled state through the second NOT gate module; and/or regulate the operating parameters of the driving regulation circuit 122 through the third regulatable NOT gate module.

It should be noted that the third regulatable NOT gate module can process the received logic signal "1" into a logic signal "0" and pull the logic signal "0" up, or process the received logic signal "0" into a logic signal "1" and pull the logic signal "1" down. In addition, the regulation of the third regulatable NOT gate module is embodied in changing the pull-up amplitude of the voltage and the pull-down amplitude of the voltage, so as to regulate the operating parameters of the driving regulation circuit 122.

It should be noted that the aforementioned data transmission circuit 10 is applied to electronic device. It should be understood that with an increase of the operating frequency of the electronic device, the data transmission speed increases and the load of the data transmission circuit 10 gets larger. At this time, the driving enhancement processing is required.

Therefore, with respect to the data transmission circuit 10 shown in FIG. 3, in some embodiments, the control circuit is further configured to control each of the second regulation circuit 1222 and the first regulation circuit 1221 to be in the enabled state when the electronic device is in a first operating state.

Optionally, when the electronic device is in a second operating state, the control circuit is further configured to control the first regulation circuit 1221 to be in the disabled state and control the second regulation circuit 1222 to be in the enabled state.

Optionally, when the electronic device is in a third operating state, the control circuit is further configured to control each of the first regulation circuit 1221 and the second regulation circuit 1222 to be in the disabled state.

It should be noted that in the embodiments of the present disclosure, the operating state is used for describing a load state of the electronic device. For example, the operating state may indicate an operating frequency of the electronic device, the operating frequency corresponding to the first operating state is greater than the operating frequency corresponding to the second operating state, and the operating frequency corresponding to the second operating state is greater than the operating frequency corresponding to the third operating state.

In addition, the operating state may also include other state indicators, including but not limited to: a processor temperature or an operating speed.

In some embodiments, the amplitude of the driving enhancement can also be regulated more accurately. Therefore, the control circuit is also configured to regulate the operating parameters of the first regulation circuit 1221 according to the operating state of the electronic device, so as to regulate the amplitude of the driving enhancement performed by the first regulation circuit 1221; and/or regulate the operating parameters of the second regulation circuit 1222 according to the operating frequency of the electronic device, to regulate the amplitude of the driving enhancement performed by the second regulation circuit 1222.

It should also be noted that the data processing circuit 11 may be configured to process four parallel data signals into one serial data signal. Thus, in some embodiments, the first data signal includes a first data sub-signal, a second data sub-signal, a third data sub-signal, and a fourth data sub-signal. The data processing circuit 11 includes a first latch, a second latch, a third latch, a fourth latch and an output module.

The data processing circuit 11 is configured to store the first data sub-signal in the first latch, store the second data sub-signal in the second latch, store the third data sub-signal in the third latch, and store the fourth data sub-signal in the fourth latch.

The data processing circuit 11 is further configured to output the first data sub-signal, the second data sub-signal, the third data sub-signal and the fourth data sub-signal in sequence through the output module, to obtain the second data signal.

To sum up, first, according to the embodiments of the present disclosure, the driving regulation circuit is added in the data transmission circuit, and the driving regulation circuit can perform driving enhancement on the signal under a large load (such as high frequency) state, so as to improve transmission performance of signals, reduce ISI and achieve a high data transmission speed. Secondary, the embodiments of the present disclosure also provide multiple design methods of the driving regulation circuit, so as to flexibly set the number and position of the driving regulation circuit according to the actual situation. Third, the embodiments of the present disclosure also provides a multi-level control strategy for the driving regulation circuit, not only the driving regulation circuit can be controlled to be enabled or disabled, but also the operating parameters of the driving regulation circuit can be regulated, so as to perform the driving enhancement processing according to different scenes and reduce power consumption while ensuring data transmission performance.

The embodiments of the present disclosure provide a data transmission circuit including a data processing circuit and a data driving circuit. The data processing circuit is configured to receive the first data signal in the parallel state and convert the first data signal into the second data signal in the serial state. The data driving circuit includes a driving main circuit and a driving regulation circuit. The data driving circuit is configured to reduce, in response to the driving regulation circuit being in an enabled state, a voltage difference of the second data signal through the driving regulation circuit, to shorten a charging and discharging time and implement driving enhancement; and perform, through the driving main circuit, driving on an enhanced second data signal to obtain a target transmission signal. In this way, the driving enhancement can be performed, through the driving regulation circuit, on the signal in the transmission process, thereby improving the transmission performance of the signal, partially improving the ISI problem and improving the data transmission speed.

Figure 5:
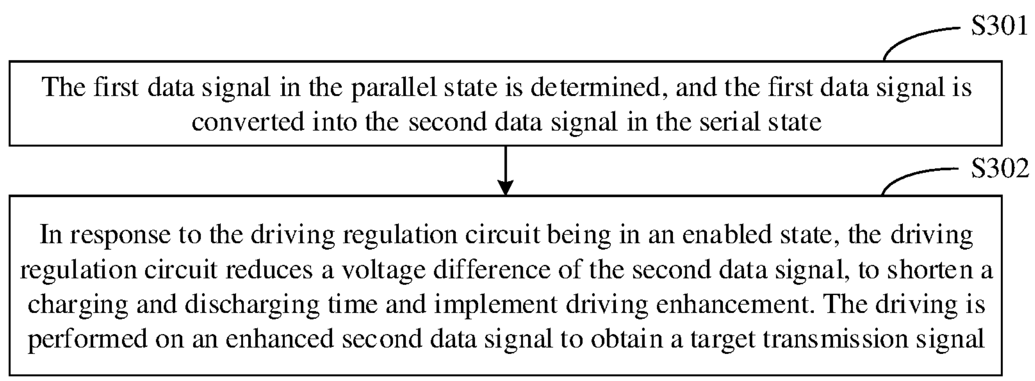
FIG. 5 is a flowchart of a data transmission method according to an embodiment of the present disclosure.

In an embodiment of the present disclosure, with reference to FIG. 5, which is a flowchart of a data transmission method according to an embodiment of the present disclosure is shown, the method may include operations S301 to S302 as shown in FIG. 5.

In operation S301, a first data signal in a parallel state is determined, and the first data signal is converted into a second data signal in a serial state.

It should be noted that the data transmission method in the embodiments of the present disclosure is applied to multiple electronic devices, such as DRAM, Static SRAM, SDRAM, and the like, which are only examples in the embodiments of the present disclosure hereafter and are not limited thereto.

Specifically, as shown in FIG. 1, at least a data transmission circuit 10 is included in the electronic device and the data transmission circuit includes a driving regulation circuit 122.

In embodiments of the present disclosure, the first data signal in the parallel state needs to be converted into a second data signal in a serial state, for facilitating subsequent transmission of the second data signal.

In operation S302, in response to the driving regulation circuit being in an enabled state, a voltage difference of the second data signal is reduced through the driving regulation circuit, to shorten a charging and discharging time and implement the driving enhancement. An enhanced second data signal is driven to obtain a target transmission signal.

It should be noted that when an operating frequency of the electronic device is high, a data transmission speed is high, which brings great pressure to the data transmission circuit 10. Therefore, in the process of data transmission, the driving regulation circuit 122 can be enabled, and performs driving enhancement on the second data signal, and performs driving on the enhanced second data signal to obtain the target transmission signal. In this way, since the driving enhancement is performed on the signal in the transmission process, the target transmission signal has good transmission performance, the subsequent transmission speed is high, thereby avoiding the ISI, and improving the operating frequency of the semiconductor memory.

In some embodiments, the method may further include the following operation.

The driving is performed on the second data signal to obtain the target transmission signal in response to the driving regulation circuit being in a disabled state.

It needs to be noted that in a case where the transmission speed is low, after the first data signal in the parallel state is converted into the second data signal in the serial state, the driving is performed on the second data signal to obtain the target transmission signal. Thus when the transmission speed is low, the driving regulation circuit 122 is disabled, so that current can be saved and power consumption can be reduced.

In some embodiments, the operation that the voltage difference of the second data signal is reduced through the driving regulation circuit includes the following operation.

A first voltage value is pulled down to obtain a second voltage value, and a third voltage value is pulled up to obtain a fourth voltage value, to implement the driving enhancement.

Herein, each of the first voltage value and the second voltage value is in a first level range, the second voltage value is less than the first voltage value, each of the third voltage value and the fourth voltage value is in a second level range, the fourth voltage value is greater than the third voltage value, and the second voltage value is greater than the fourth voltage value.

It should be noted that the first level range may be a level range of a logic signal "1", and the second level range may be a level range of a logic signal "0". That is to say, the first voltage value/second voltage value is the logic signal "1" in the second data signal, and the third voltage value/fourth voltage value is the logic signal "0" in the second data signal.

Thus, as shown in FIG. 1, after the driving regulation circuit 122 is enabled, the driving regulation circuit 122 performs pull down a voltage of the logic signal "1" in the second data signal and pull up a voltage of the logic signal "0" in the second data signal, to obtain an enhanced second data signal. In this way, through the driving enhancement, the voltage difference between the logic signal "1" and the logic signal "0" is reduced, subsequent transmission can be performed at a fast speed.

It should be noted that the driving processing in the embodiments of the present disclosure may include two levels of driving, i.e., the pre-driving and the main driving. Therefore, the driving regulation circuit 122 may be provided ahead of the pre-driving, or the driving regulation circuit 122 may be provided ahead of the main driving, or the driving regulation circuit 122 may be provided ahead of each of the pre-driving and the main driving.

Therefore, in an embodiment, as shown in FIG. 2, the driving regulation circuit 122 is provided ahead of the main driving. Accordingly, the operation that the voltage difference of the second data signal is reduced through the driving regulation circuit, to shorten the charging and discharging time and implement driving enhancement; and driving is performed on the enhanced second data signal to obtain the target transmission signal includes the following three operations.

Pre-driving is performed on the second data signal to obtain the pre-driven second data signal.

In response to the driving regulation circuit being in the enabled state, driving enhancement is performed on the pre-driven second data signal through the driving regulation circuit, and main driving is performed on the enhanced second data signal to obtain the target transmission signal.

In response to the driving regulation circuit being in a disabled state, main driving is performed on the pre-driven second data signal to obtain the target transmission signal.

It should be noted that, as shown in FIG. 2, the data transmission process includes the following two cases.

In a first case where the driving regulation circuit 122 is enabled, the first data signal in the parallel state is converted into the second data signal in the serial state. Pre-driving is performed on the second data signal, and enhancement is performed on the pre-driven second data signal, and main driving is performed on the enhanced second data signal, to obtain the target transmission signal.

In a second case where the driving regulation circuit 122 is disabled, the first data signal in the parallel state is converted into the second data signal in the serial state. Pre-driving is performed on the second data signal, and main driving is performed on the pre-driven second data signal to obtain the target transmission signal.

In this way, a state of the driving regulation circuit 122 can be changed in accordance with different load conditions while taking both signal transmission performance and energy consumption into account.

In another specific embodiment, as shown in FIG. 3, the driving regulation circuit is provided ahead of each of the pre-driving and the main driving, respectively. Accordingly, the driving regulation circuit 122 includes the first regulation circuit 1221 and the second regulation circuit 1222.

Accordingly, the operation that the voltage difference of the second data signal is reduced through the driving regulation circuit, to shorten the charging and discharging time and implement the driving enhancement; and the driving is performed on the enhanced second data signal to obtain the target transmission signal may include the following three operations.

In response to each of the first regulation circuit and the second regulation circuit being in the enabled state, the driving enhancement is performed on the second data signal through the first regulation circuit to obtain a primary enhanced second data signal. Pre-driving is performed on the primary enhanced second data signal to obtain a pre-driven second data signal. Driving enhancement is performed on the pre-driven second data signal through the second regulation circuit to obtain a secondary enhanced second data signal. Main driving is performed on the secondary enhanced second data signal to obtain the target transmission signal.

In response to the first regulation circuit being in the disabled state and the second regulation circuit being in the enabled state, the pre-driving is performed on the second data signal to obtain the pre-driven second data signal. Driving enhancement is performed on the pre-driven second data signal through the second regulation circuit to obtain the enhanced second data signal. Main driving is performed on the enhanced second data signal to obtain the target transmission signal.

In response to each of the first regulation circuit and the second regulation circuit being in the disabled state, the pre-driving is performed on the second data signal to obtain the pre-driven second data signal, and the main driving is directly performed on the pre-driven second data signal to obtain the target transmission signal.

It should be noted that, as shown in FIG. 3, the operation process of the data transmission circuit 10 includes the following three cases.

In a first case where each of the first regulation circuit 1221 and the second regulation circuit 1222 is enabled, the first data signal in the parallel state is converted into the second data signal in the serial state. The first regulation circuit 1221 performs primary enhancement on the second data signal, and performs pre-driving on the primary enhanced second data signal. The second regulation circuit 1222 performs secondary enhancement on the pre-driven second data signal, and performs main driving on the secondary enhanced second data signal, to obtain the target transmission signal.

In a second case where the first regulation circuit 1221 is disabled and the second regulation circuit 1222 is enabled, the first data signal in the parallel state is converted into the second data signal in the serial state. Pre-driving is performed on the second data signal. The second regulation circuit 1222 performs enhancement on the pre-driven second data signal. The main driving circuit 1212 performs main driving on the enhanced second data signal, to obtain the target transmission signal.

In a third case where each of the first regulation circuit 1221 and the second regulation circuit 1222 is disabled, the first data signal in the parallel state is converted into the second data signal in the serial state. Pre-driving is performed on the second data signal, and then main driving is performed on the pre-driven second data signal to obtain the target transmission signal.

It should be noted that the operation process of the data transmission circuit 10 may also include a fourth case in which the first regulation circuit 1221 is enabled and the second regulation circuit 1222 is disabled. The effect of the fourth case is close to that of the second case mentioned above (i.e., the case that the first regulation circuit is disabled and the second regulation circuit is enabled). In order to improve the control efficiency, the fourth case is yet not applied in the embodiments of the present disclosure, and those skilled in the art can select the case according to the actual situation. So the case is also within the protection scope of the embodiments of the present disclosure.

In this way, the states of the first regulation circuit 1221 and the second regulation circuit 1222 can be changed in accordance different load conditions while taking both signal transmission performance and energy consumption into account.

According to the embodiment of the present disclosure, multi-level control may be also performed by the driving regulation circuit, to balance the transmission efficiency and the power consumption. Thus, in some embodiments, the method may further include the following operation.

The driving regulation circuit is controlled to be in the enabled state or the disabled state according to an operating state of the electronic device, and/or, operating parameters of the driving regulation circuit are regulated according to the operating state of the electronic device, to regulate an amplitude of the driving enhancement performed by the driving regulation circuit.

It should be noted that in the embodiment of the present disclosure, a specific driving regulation circuit can provide at least two levels of control strategies. Firstly, the driving regulation circuit can be controlled to be enabled or disabled, to determine whether to perform driving enhancement. Secondly, when the driving regulation circuit is in the enabled state, the operating parameters of the driving regulation circuit may be controlled, thereby regulating the amplitude of the driving enhancement.

The embodiments of the present disclosure provide a data transmission method including the following operations. A first data signal in the parallel state is determined and the first data signal is converted into the second data signal in the serial state. When the driving regulation circuit is in the enabled state, a voltage difference of the second data signal is reduced through the driving regulation circuit, to shorten a charging and discharging time and implement driving enhancement. The driving is performed on an enhanced second data signal to obtain the target transmission signal. In this way, the driving enhancement can be performed, through the driving regulation circuit, on the signal in the transmission process, thereby improving the transmission performance of the signal, partially improving the ISI problem and improving the data transmission speed.

Figure 6:
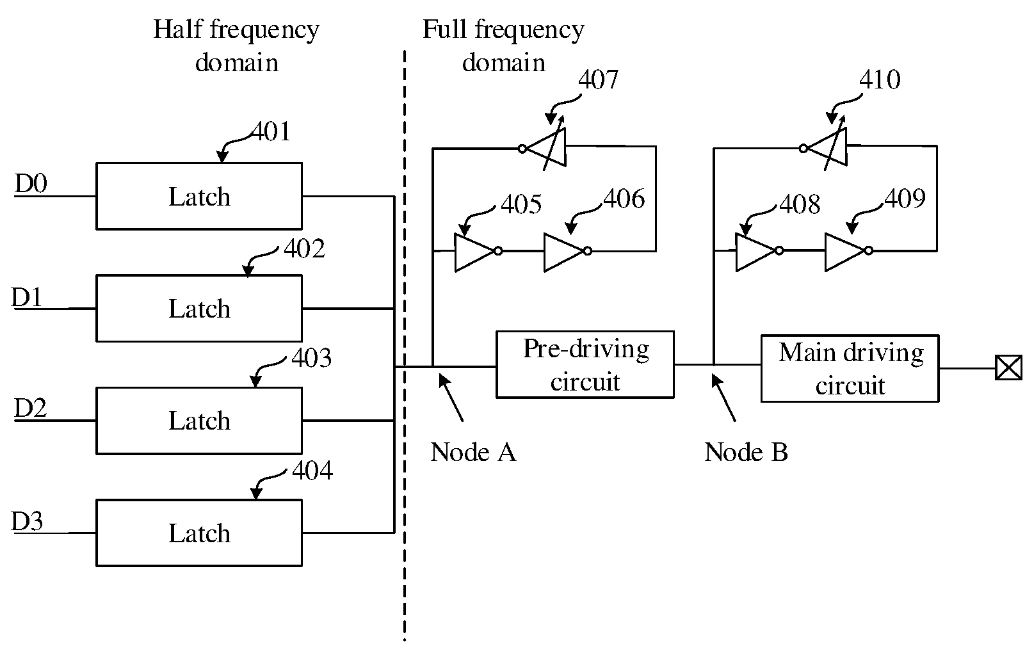
FIG. 6 is a schematic structural diagram of a data transmission circuit according to an embodiment of the present disclosure.

In an embodiment of the present disclosure, with reference to FIG. 6, which is a schematic diagram of the specific structure of a data transmission circuit 10 according to an embodiment of the present disclosure, the data transmission circuit 10 includes a half frequency domain and a full frequency domain as shown in FIG. 6.

The data transmission circuit 10 includes a latch 401, a latch 402, a latch 403 and a latch 404 in the half frequency domain. The latch 401, the latch 402, the latch 403, the latch 404, and the output module (not shown in FIG. 6) together constitute a 4-1MUX (equivalent to the data processing circuit). The 4-1MUX receives parallel data signals (D0, D1, D2, and D3, which are equivalent to the first data signal) and outputs the parallel data signals in sequence to obtain a serial data signal (equivalent to the second data signal).

The data transmission circuit 10 includes a pre-driving circuit and a main driving circuit in the full frequency domain. Herein, an input end of the pre-driving circuit is called as Node A, and an input end of the main driving circuit is called as Node B. A first regulation circuit is provided at Node A, and a second regulation circuit is provided at Node B. The first regulation circuit includes a first NOT gate module 405, a second NOT gate module 406 and a third regulatable NOT gate module 407. The second regulation circuit includes a first NOT gate module 408, a second NOT gate module 409 and a third regulatable NOT gate module 410. The connections between these modules are shown in FIG. 6.

In this way, in a high frequency state, during the process of performing the driving processing on the signal by the pre-driving circuit and the main driving circuit, the driving enhancement is performed on the signal by the first regulation circuit at Node A and the second regulation circuit at Node B, to improve the transmission performance of the signal, raise the transmission speed of the signal, and improve the ISI problem of the electronic device in the high frequency state, and the electronic device is described to have a high operation frequency. In an intermediate frequency state, the first regulation circuit at Node A can be disabled, and during the process of performing the driving processing on the signal by the pre-driving circuit and the main driving circuit, the driving enhancement is performed on the signal by only the second regulation circuit at Node B, thereby saving power consumption as much as possible while ensuring the transmission performance of the signal. In a low frequency state, each of the first regulation circuit at Node A and the second regulation circuit at Node B can be disabled simultaneously, i.e., no driving enhancement is performed on the signal, and only the driving processing is performed on the signal by the pre-driving circuit and the main driving circuit, to save a current and reduce the power consumption.

In addition, according to a value of the operating frequency, the performance of the driving regulation circuit (the first regulation circuit or the second regulation circuit) can be regulated by regulating the third regulatable NOT gate module in the driving regulation circuit, thereby providing the multi-level control strategy while taking both power consumption and transmission performance into account.

The embodiments of the present disclosure provide a data transmission circuit. Through the further explanation of the foregoing embodiments in the embodiments of the present disclosure, it can be seen that, the first regulation circuit/the second regulation circuit are added according to the embodiments of the present disclosure, to reduce the ISI problem of the 4-1 MUX in the high frequency state, provide a high signal transmission speed, so that the electronic device achieves a high data transmission speed. In addition, a large current is generated and power consumption is caused in the enabled state of the driving regulation circuit (i.e., the first regulation circuit or the second regulation circuit). Therefore, the driving regulation circuit can be enabled in the high frequency state, to improve the signal transmission speed, and the driving regulation circuit can be disabled in the non-high frequency state, to save power consumption, thereby providing a balance between power consumption and transmission performance.

Figure 7:
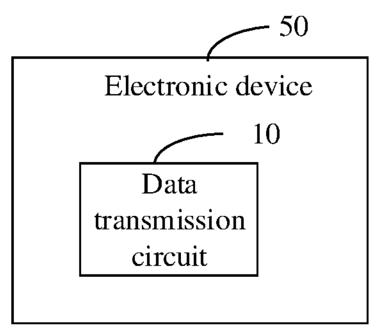
FIG. 7 is a schematic structural diagram of an electronic device according to an embodiment of the present disclosure.

In another embodiment of the present disclosure, with reference to FIG. 7, which is a schematic structural diagram of an electronic device according to an embodiment of the present disclosure, the electronic device 50 includes the data transmission circuit 10 according to any of the foregoing embodiments as shown in FIG. 7.

Since the electronic device 50 includes the data transmission circuit 10, the driving enhancement is performed on the signal during transmission by the driving regulation circuit, thereby improving the transmission performance of the signal, partially improving the ISI problem and improving the data transmission speed.

The above are only preferred embodiments of the present disclosure and are not intended to limit the scope of protection of the present disclosure.

It is to be noted that, in this disclosure, the terms "includes", "including" or any other variation thereof, are intended to cover a non-exclusive inclusion, such that a process, method, article, or device including a list of elements includes not only those elements but also other elements not expressly listed, or also includes elements inherent to such process, method, article, or device. Without more limitations, an element defined by the statement "including a . . . " does not exclude additional identical elements in a process, method, article, or apparatus that includes the element.

The sequence number of the above-described embodiments of the present disclosure are for the purpose of description only and do not represent the advantages or disadvantages of the embodiments.

The methods disclosed in the method embodiments provided in this disclosure can be arbitrarily combined without conflict to obtain new method embodiments.

The features disclosed in the product embodiments provided in this disclosure can be arbitrarily combined without conflict to obtain new product embodiments.

The features disclosed in the method or apparatus embodiments provided in this disclosure can be arbitrarily combined without conflict to obtain new method embodiments or apparatus embodiments.

The above is only the specific embodiments of the disclosure, but the scope of protection of the disclosure is not limited to thereto. Changes or substitution which can easily thought by any person skilled in the technical field within the technical scope of the disclosure shall be covered in the scope of protection of the disclosure. Therefore, the scope of protection of the disclosure shall be subject to the scope of protection of the claims.

INDUSTRIAL PRACTICALITY

The embodiments of the present disclosure provide a data transmission circuit, a data transmission method and an electronic device. The data transmission circuit includes a data processing circuit and a data driving circuit. The data processing circuit is configured to receive a first data signal in a parallel state and convert the first data signal into a second data signal in a serial state. The data driving circuit includes a driving main circuit and a driving regulation circuit. The data driving circuit is configured to reduce, in response to the driving regulation circuit being in an enabled state, a voltage difference of the second data signal through the driving regulation circuit, to shorten a charging and discharging time and implement driving enhancement; and perform, through the driving main circuit, driving on an enhanced second data signal to obtain a target transmission signal. In this way, the driving enhancement can be performed, through the driving regulation circuit, on the signal in the transmission process, thereby improving the transmission performance of the signal, partially improving the ISI problem and improving the data transmission speed.

The invention claimed is:

1. A data transmission circuit, comprising:

a data processing circuit, configured to receive a first data signal in a parallel state and convert the first data signal into a second data signal in a serial state; and a data driving circuit comprising a driving main circuit and a driving regulation circuit, wherein the driving regulation circuit is configured to reduce, in response to the driving regulation circuit being in an enabled state, a voltage difference of the second data signal, to shorten a charging and discharging time and implement driving enhancement, and the driving main circuit is configured to perform driving on an enhanced second data signal to obtain a target transmission signal.

2. The data transmission circuit of claim 1, wherein the data transmission circuit is further configured to perform, through the driving main circuit in response to the driving regulation circuit being in a disabled state, driving on the second data signal, to obtain the target transmission signal.

3. The data transmission circuit of claim 1, wherein the driving regulation circuit is configured to pull a first voltage value down to obtain a second voltage value, and pull a third voltage value up to obtain a fourth voltage value, to implement the driving enhancement, wherein each of the first voltage value and the second voltage value is in a first level range, the second voltage value is less than the first voltage value, each of the third voltage value and the fourth voltage value is in a second level range, the fourth voltage value is greater than the third voltage value, and the second voltage value is greater than the fourth voltage value.

4. The data transmission circuit of claim 3, wherein the driving main circuit comprises a pre-driving circuit and a main driving circuit, and the driving regulation circuit comprises a first regulation circuit and a second regulation circuit, wherein the first regulation circuit is connected to an input end of the pre-driving circuit, and a second regulation circuit is connected to an input end of the main driving circuit, wherein the data driving circuit is further configured to, in response to each of the first regulation circuit and the second regulation circuit being in the enabled state, perform driving enhancement on the second data signal through the first regulation circuit to obtain a primary enhanced second data signal, perform pre-driving on the primary enhanced second data signal through the pre-driving circuit to obtain a pre-driven second data signal, perform driving enhancement on the pre-driven second data signal through the second regulation circuit to obtain a secondary enhanced second data signal, and perform main driving on the secondary enhanced second data signal through the main driving circuit to obtain the target transmission signal.

5. The data transmission circuit of claim 4, wherein the data driving circuit is further configured to, in response to the first regulation circuit being in a disabled state and the second regulation circuit being in the enabled state, perform pre-driving on the second data signal through the pre-driving circuit to obtain the pre-driven second data signal, perform driving enhancement on the pre-driven second data signal through the second regulation circuit to obtain the enhanced second data signal, and perform main driving on the enhanced second data signal through the main driving circuit to obtain the target transmission signal.

6. The data transmission circuit of claim 4, wherein the data driving circuit is further configured to, in response to each of the first regulation circuit and the second regulation circuit being in a disabled state, perform pre-driving on the second data signal through the pre-driving circuit to obtain the pre-driven second data signal, and perform main driving on the pre-driven second data signal through the main driving circuit to obtain the target transmission signal.

7. The data transmission circuit of claim 4, further comprising a control circuit, wherein the control circuit is configured to performing at least one of:

controlling the driving regulation circuit to be in the enabled state or a disabled state; or regulating operating parameters of the driving regulation circuit, to regulate an amplitude of the driving enhancement performed by the driving regulation circuit.

8. The data transmission circuit of claim 7, wherein the driving regulation circuit comprises a first NOT gate module, a second NOT gate module, and a third regulatable NOT gate module, wherein an output end of the first NOT gate module is connected to an input end of the second NOT gate module, and an output end of the second NOT gate module is connected to an input end of the third regulatable NOT gate module; and an output end of the third regulatable NOT gate module is connected to an input end of the first NOT gate module, the driving regulation circuit is configured to receive the second data signal and output the enhanced second data signal.

9. The data transmission circuit of claim 8, wherein the control circuit is further configured to performing at least one of following operations:

controlling, through the second NOT gate module, the driving regulation circuit to be in the enabled state or the disabled state, or regulating, through the third regulatable NOT gate module, the operating parameters of the driving regulation circuit.

10. The data transmission circuit of claim 9, wherein the data transmission circuit is applied to an electronic device, and the control circuit is further configured to:

control each of the first regulation circuit and the second regulation circuit to be in the enabled state in response to the electronic device being in a first operating state; or control the first regulation circuit to be in the disabled state and the second regulation circuit to be in the enabled state in response to the electronic device being in a second operating state; or control each of the first regulation circuit and the second regulation circuit to be in the disabled state in response to the electronic device being in a third operating state, wherein the operating state indicates an operating frequency of the electronic device.

11. The data transmission circuit of claim 10, wherein the control circuit is further configured to at least one of:

regulate, according to the operating state of the electronic device, operating parameters of the first regulation circuit to regulate an amplitude of the driving enhancement performed by the first regulation circuit; or regulate, according to the operating frequency of the electronic device, operating parameters of the second regulation circuit to regulate an amplitude of the driving enhancement performed by the second regulation circuit.

12. The data transmission circuit of claim 1, wherein the driving main circuit comprises a pre-driving circuit and a main driving circuit, and the driving regulation circuit is connected to an input end of the main driving circuit, wherein the pre-driving circuit is configured to perform pre-driving on the second data signal to obtain a pre-driven second data signal; and the main driving circuit is configured to perform, after the driving regulation circuit performs driving enhancement on the pre-driven second data signal in response to the driving regulation circuit being in the enabled state, main driving on the enhanced second data signal, to obtain the target transmission signal.

13. The data transmission circuit of claim 12, wherein the main driving circuit is further configured to perform main driving on the pre-driven second data signal in response to the driving regulation circuit being in a disabled state, to obtain the target transmission signal.

14. The data transmission circuit of claim 1, wherein the first data signal comprises a first data sub-signal, a second data sub-signal, a third data sub-signal and a fourth data sub-signal, and the data processing circuit comprises a first latch, a second latch, a third latch, a fourth latch and an output module, wherein the data processing circuit is configured to:

store the first data sub-signal in the first latch, store the second data sub-signal in the second latch, store the third data sub-signal in the third latch, and store the fourth data sub-signal in the fourth latch; and output the first data sub-signal, the second data sub-signal, the third data sub-signal and the fourth data sub-signal in sequence through the output module, to obtain the second data signal.

15. A data transmission method applied to a data transmission circuit comprising a driving regulation circuit, the method comprising:

determining a first data signal in a parallel state, and converting the first data signal into a second data signal in a serial state; and in response to the driving regulation circuit being in an enabled state, reducing a voltage difference of the second data signal through the driving regulation circuit, to shorten a charging and discharging time and implement driving enhancement, and performing driving on an enhanced second data signal to obtain a target transmission signal.

16. The data transmission method of claim 15, further comprising:

in response to the driving regulation circuit being in a disabled state, performing driving on the second data signal to obtain the target transmission signal.

17. The data transmission method of claim 15, wherein the reducing the voltage difference of the second data signal through the driving regulation circuit comprises:

pulling a first voltage value down to obtain a second voltage value, and pulling a third voltage value up to obtain a fourth voltage value, to implement the driving enhancement, wherein each of the first voltage value and the second voltage value is in a first level range, the second voltage value is less than the first voltage value, each of the third voltage value and the fourth voltage value is in a second level range, the fourth voltage value is greater than the third voltage value, and the second voltage value is greater than the fourth voltage value.

18. The data transmission method of claim 15, wherein the reducing the voltage difference of the second data signal through the driving regulation circuit, to shorten the charging and discharging time and implement driving enhancement, and the performing driving on the enhanced second data signal to obtain the target transmission signal comprises:

performing pre-driving on the second data signal to obtain a pre-driven second data signal;

in response to the driving regulation circuit being in the enabled state, performing, through the driving regulation circuit, driving enhancement on the pre-driven second data signal, and performing main driving on the enhanced second data signal to obtain the target transmission signal; and in response to the driving regulation circuit being in a disabled state, performing main driving on the pre-driven second data signal to obtain the target transmission signal.

19. The data transmission method of claim 15, wherein the driving regulation circuit comprises a first regulation circuit and a second regulation circuit, wherein the reducing the voltage difference of the second data signal through the driving regulation circuit, to shorten the charging and discharging time and implement driving enhancement, and the performing driving on the enhanced second data signal to obtain the target transmission signal comprises:

in response to each of the first regulation circuit and the second regulation circuit being in the enabled state, performing driving enhancement on the second data signal through the first regulation circuit to obtain a primary enhanced second data signal, performing pre-driving on the primary enhanced second data signal to obtain a pre-driven second data signal, performing driving enhancement on the pre-driven second data signal through the second regulation circuit to obtain a secondary enhanced second data signal, and performing main driving on the secondary enhanced second data signal to obtain the target transmission signal;

in response to the first regulation circuit being in a disabled state and the second regulation circuit being in the enabled state, performing pre-driving on the second data signal to obtain the pre-driven second data signal, performing driving enhancement processing on the pre-driven second data signal through the second regulation circuit to obtain the enhanced second data signal; and performing main driving on the enhanced second data signal to obtain the target transmission signal; and in response to each of the first regulation circuit and the second regulation circuit being in the disabled state, performing pre-driving on the second data signal to obtain the pre-driven second data signal, and performing main driving on the pre-driven second data signal to obtain the target transmission signal.

20. An electronic device comprising a data transmission circuit, wherein the data transmission circuit comprises:

a data processing circuit, configured to receive a first data signal in a parallel state and convert the first data signal into a second data signal in a serial state; and a data driving circuit comprising a driving main circuit and a driving regulation circuit, wherein the driving regulation circuit is configured to reduce, in response to the driving regulation circuit being in an enabled state, a voltage difference of the second data signal, to shorten a charging and discharging time and implement driving enhancement, and the driving main circuit is configured to perform driving on an enhanced second data signal to obtain a target transmission signal.

* * * * *